June 20, 1944.   J. A. CROWLEY, JR., ET AL   2,352,080
BIN LEVEL INDICATOR
Filed April 15, 1943
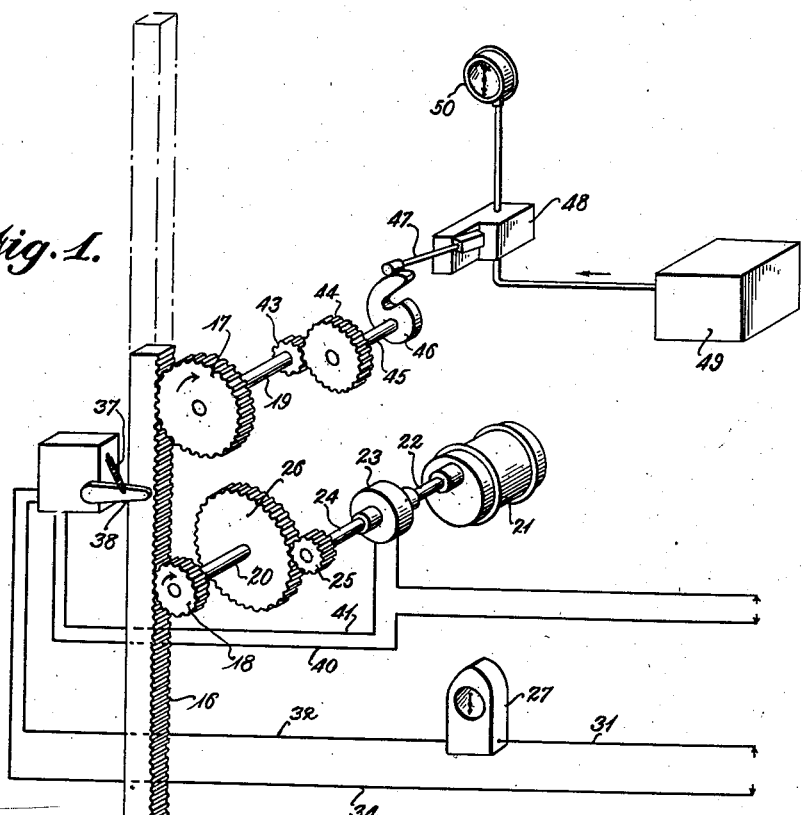
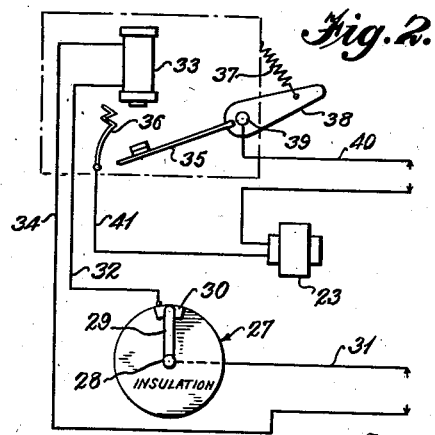
Inventors
John A. Crowley, Jr. and
Edward L. Sinclair
By Myron J. Burkhard
Attorney Patented June 20, 1944

2,352,080

UNITED STATES PATENT OFFICE 2,352,080

BIN LEVEL INDICATOR

John A. Crowley, Jr., Woodbury, N. J., and Edward L. Sinclair, Philadelphia, Pa., assignors to Socony-Vacuum Oil Company, Incorporated, a corporation of New York Application April 15, 1943, Serial No. 483,200

7 Claims. (Cl. 33—126.6)

This invention relates to indicators and more particularly to apparatus for measuring and indicating in an automatic manner the level of a solid material in a bin, container, or the like.

In the automatic measurement of the level of a solid material in a container, it is usually desirable to provide a follower which is maintained at all times at the surface level of such material and may, through suitable connections, actuate apparatus from which sensory indication of level may be derived. Since, in the case of solid material, it is impossible to use a float for this purpose, it has been proposed in at least one instance, to provide a continuously operating screw so actuated as to drive itself to the surface of the material upon fluctuation in the level thereof and to maintain itself in that position. The screw shaft, in apparatus of this kind, is thus axially displaced upon variation in the level of material in the container and an indicating device may be operated in response to such displacement of the screw shaft to afford either a remote or local indication of solid level. While the foregoing type of level indicator is satisfactory for certain kinds of material, it has the disadvantage that when used with solid material of large grain size or tightly packed material of smaller grain size, such as clay, very considerable driving torque is necessary to force the screw through the material to the upper surface thereof. Since the driving force must be supplied continuously, the arrangement becomes expensive to operate and the forces exerted become so great that a sufficiently sturdy device is difficult to construct. Thus, the cost of the indicator and the power required for driving it considerably restrict the economically feasible field of employment of an indicator of the continuously driven screw type.

In an effort to overcome the foregoing disadvantages it has been proposed to provide a follower mounted on a shaft adapted to reciprocate at a frequency only sufficient to keep it at the level of the solid material. In one instance, it has been proposed to drive the follower shaft by a pawl and the resulting construction has been successfully used where the total measured fluctuation is not very great. However, where the total fluctuation is very substantial, movement of the pawl in such a way as to upwardly displace the follower shaft for the full length of the container is difficult of attainment. Thus, in overcoming the disadvantage of excessive power requirements in the case of a continuous screw type follower, mechanical difficulties are encountered in intermittently raising a reciprocating follower above the level of the material and then releasing the same for gravity fall to contact position, particularly where the path of movement is relatively great and hence subject to very considerable variation as the level of the material in the container fluctuates.

It is therefore an object of this invention to overcome the foregoing disadvantages and to provide an indicator of the reciprocating follower type in which the reciprocations, regardless of stroke length, are easily and conveniently effected at an adjustably predeterminable frequency, which frequency is automatically maintained irrespective of stroke variations of the follower shaft.

It is contemplated according to this invention that a level indicating device be provided which is of wide adaptability to all kinds of solid material regardless of flow characteristics, grain size, or tendency to agglomeration. Other objects and advantages of this invention will be apparent from a consideration of the following detailed description in conjunction with the annexed drawing wherein:

Figure 1 is a diagrammatic prospective view of an indicating device constructed according to this invention; and Figure 2 is a diagrammatic view of one form of frequency control for actuation of the material level follower of the device of Figure 1.

Referring now in greater detail to Figure 1, it can be seen that a rod 10 is arranged to reciprocate vertically through a bearing 11 located in the top wall 12 of a tank or bin 13 containing a solid material such as clay or the like, generally indicated at 14. The lower end of rod 10 is provided with a foot 15 of a configuration and diameter such that it offers sufficient surface area to the material 14 to prevent its penetration below the surface thereof under the urging of the weight and/or acceleration of the rod and any elements supported thereby.

Rod 10, at a point above bearing 11, is in the form of a rack 16, the teeth of which are disposed to mesh with gears 17 and 18 mounted respectively on shafts 19 and 20. It will be understood that shafts 19 and 20 are mounted in suitable conventional bearings, not shown, not only to absorb thrusts incident to rotation but also, through the respective gears, to prevent angular displacement of rack 16 away from its meshing position. Of course, in the latter connection, it is also possible to make those portions of rod 10 which pass through bearing 11 and the bearing aperture of non-round cross section to inhibit the effect of any couple imparted to the rod about its vertical axis.

Since it is contemplated that the illustrated device serve as an indicator while container 13 is being filled as well as when the level of material 14 is static, means are provided to keep the foot 15 at rest on the upper surface of the material. To this end an electric motor 21, of the gear head type, is provided, the rotor shaft 22 of said motor being attached to the driving side of a magnetic clutch 23, of any conventional design. The driven side of clutch 23 is connected to shaft 24 on which gear 25 is mounted, the latter meshing with and driving gear 26 keyed to shaft 20 which, it will be recalled, carries also thereon driving gear 18 in mesh with rack 16. It is contemplated, at least in the illustrated form of the invention, that motor 21 be of a unidirectional type and that the rack be raised by rotation of gear 18 in the direction of the arrow in Figure 1.

Clearly it is not desirable that clutch 23 be continuously engaged since such action would result in a continuous driving force at gear 18 which would hold rack 16 in the broken line position and thus keep foot 15 at the top of container 13 above the level of material 14 so that level measurement would not be possible. What is desired is that foot 15 be periodically raised to the top of container 13 and then allowed to fall to a position resting on the upper surface of material 14. Thus, if material is being added to the container and so covers foot 15, the level measurement is soon corrected by raising foot 15 up through the mass to the top of the container and allowing it to fall again to the surface to again register an accurate level indication.

To attain the results of the preceding paragraph, a timing device 27 is associated with the circuit to the field of magnetic clutch 23. Upon reference to Figure 2 it can be seen that the timing device includes a shaft 28, driven at a constant speed from any source, not shown. Shaft 28 carries thereon a contact arm 29 which, at one point in its path of arcuate movement, contacts a conductor plate or point 30. The timer 27 is so constructed that an electric current may pass from a source through a conductor 31 into arm 29. The arm, however, is insulated from plate 30 except in the one angular position of contact. When the position of contact is reached current from conductor 31 may pass through arm 29 and plate 30 into and through conductor 32, connected to the latter, and from thence to solenoid 33, the return circuit for which is made up of conductor 34. Thus, once in every revolution of timer shaft 28 the circuit to solenoid 33 will be closed and the latter energized. The frequency of successive energizations is, of course, predeterminable by the rate of speed of shaft 28.

Each time that solenoid 33 is energized switch bar 35 is drawn upwardly into the notch in a spring detent 36 against the bias of spring 37 attached to arm 38, the latter being keyed, in common with bar 35, to a shaft 39. Since a conductor 40 is connected to bar 35 and a conductor 41 to spring detent 36, it is evident that the circuit to the field of clutch 23 is closed every time solenoid 33 is energized. Due to the provision of spring detent 36, however, the circuit to the field of magnetic clutch 23 is held closed when the arm 29 of timer 27 moves out of contact with plate 30 to de-energize the solenoid 33. Thus, after solenoid 33 has been momentarily energized, clutch 23 is closed and motor 21 drives the rack 16 upwardly until pin 42 on rack 16 strikes arm 38 of the switch controlling the circuit to the magnetic clutch. As soon as pin 42 has displaced arm 48 sufficiently so that bar 35 is moved out of the notch in spring detent 36, the circuit to clutch 23 is broken and the driving connection between the motor and gear 18 is disestablished so that rack 16, rod 18 and foot 15 fall by gravity until the latter rests on top of material 14 in container 13. In this regard note that switch bar 35 is held out of engagement with detent 36 after pin 42 has moved below and out of contact with arm 38 because of the action of spring 37. The circuit to clutch 23 will thus remain open until solenoid 33 is again energized. It should be noted that the upward strokes of rack 16 are shortened as the level of material 14 rises higher in container 13. The frequency of such strokes, however, will remain constant and dependent upon the rate of angular displacement of arm 29. In view of the arrangement of switch bar 35 and spring detent 36 operational frequency can be kept constant while the time during which the circuit to clutch 23 is closed is automatically varied to compensate for different lengths of stroke on the part of rack 16.

It has been previously mentioned that rack 16 in addition to meshing with gear 18 likewise meshes with a gear 17. Upon reference to Figure 1 it can be seen that shaft 19 on which gear 17 is mounted also carries a gear 43 which, in turn, meshes with a gear 44 mounted on a shaft 45. Shaft 45, in addition to supporting gear 44, likewise carries a cam 46. A follower 47 is mounted in contact with the cam and the movement of the follower adjusts a valve, not shown, located within housing 48. This valve serves to control the supply of air from a pressure container 49 to indicator 50. It will be understood that the valve 48 and indicator 50 may be of any conventional type. The rate of flow of air through the valve, however, will be predetermined by the position of follower 47. Similarly, the position of follower 47 will be predetermined by the angular position of cam 46 when foot 15 is at rest on the surface of the material 14 in container 13. The driving arrangement between rack 16 and cam 46 is such that when the rack is in its lowermost position, the air admitted through valve 48 to indicator 50 will cause the latter to read "0." As the rack is raised the indicator will move from "0" to "Full" and will then drop back to a reading above "0" and less than "Full" depending upon the level of the material in the container. Thus, the operator looks at the indicator immediately after an oscillation thereof and is so apprised of the exact level of the material 14 within container 13 despite the fact that the whole arrangement except indicator 50 may be entirely enclosed within a housing.

Although in the specification and the accompanying drawing there is shown and described a preferred embodiment of this invention and various modifications thereof, and although various alternatives are suggested, these are not intended to be exhaustive nor limiting of the invention, but, on the contrary, are given for the purpose of illustrating it and instructing others in the principles thereof as well as the best practical manner of utilizing the invention in order that others may be enabled to modify it and apply it in numerous forms each as may be best suited as to conditions and requirements in any particular instance.

What is claimed is:

1. A device for measuring the level of a solid material in a container comprising, a follower adapted to rest on the surface of said material, means for upwardly driving said follower to a predetermined raised position above the level of the material, means for periodically energizing said driving means, means responsive to the attainment by said follower of the predetermined position for de-energizing said driving means to release the said follower to fall to a position at rest on the surface of said material, and means responsive to the rest position of said follower for indicating material level.

2. A device for measuring the level of a solid material in a container comprising, a follower adapted to rest on the surface of said material, means for raising said follower to a predetermined position above the material level in said container, electric means for driving said follower raising means, timing means for periodically energizing said electric means, means responsive to the attainment of said predetermined position by said follower for de-energizing said electric means to release said follower to fall to a position at rest on the surface of said material and means responsive to the position of said follower for rendering an indication of material level.

3. A device for measuring the level of a solid material in a container comprising, a follower adapted to rest on the surface of said material, means for raising said follower to a predetermined position above the material level in said container, a motor, means including a clutch connecting said motor for driving said follower raising means, timing means for periodically causing engagement of said clutch, means responsive to the attainment of said predetermined position by said follower for causing disengagement of said clutch to permit said follower to fall to a position at rest on the surface of said material, and means responsive to the position of said follower for rendering an indication of material level.

4. A device for measuring the level of a solid material in a container comprising, a follower adapted to rest on the surface of said material, means for raising said follower to a predetermined position above the material level in said container, an electric motor, means including an electric clutch connecting said motor for driving said follower raising means, timing means for periodically energizing said electric clutch for torque transmission, means responsive to the attainment of said predetermined position by said follower for de-energizing said electric clutch to disconnect the motor from the follower raising means so that said follower falls to a position at rest on the surface of said material and means responsive to the position of said follower for rendering an indication of material level.

5. A device for measuring the level of a solid material in a container comprising, a follower adapted to rest on the surface of said material, means for periodically raising said follower above the level of said material and thereafter releasing it to fall to the surface of the material so as to maintain the follower at the surface level, a cam, means connecting the cam with the material follower to alter the angular position of the former in response to axial displacement of the latter, a cam follower operated by said cam, a valve actuated by said cam follower, a source of fluid under pressure, an indicating device, and means connecting said source and said indicating device through said valve whereby fluctuations in material level will change the angular position of the cam to open or close the valve to thereby vary the amount of fluid under pressure supplied to said indicator.

6. A device for measuring the level of a solid material in a container comprising, a follower adapted to rest on the surface of said material, means defining a rack extending upwardly from said follower, a driving pinion in engagement with said rack, power means for actuating said driving pinion in a rack raising direction, a timing device for periodically energizing said power means, means responsive to the attainment of a predetermined raised position on the part of said rack and follower for de-energizing said power means whereby the rack and follower will fall by gravity until the latter rests on the surface of the material, and means responsive to the vertical position of the rack for indicating level.

7. A device for measuring the level of a solid material in a container comprising, a follower adapted to rest on the surface of said material, means defining a rack extending upwardly from said follower, a driving pinion in engagement with said rack, power means for actuating said driving pinion in a rack raising direction, a timing device for periodically energizing said power means, means responsive to the attainment of a predetermined raised position on the part of said rack and follower for de-energizing said power means whereby the rack and follower will fall by gravity until the latter rests on the surface of the material, a cam, gearing establishing a driving connection between the cam and rack so that axial displacement of the latter will cause angular displacement of the former, a cam follower operated by said cam, a valve actuated by said cam follower, a source of fluid under pressure, an indicating device, and means connecting said source and said indicating device through said valve whereby fluctuations in material level will change the angular position of the cam to open or close the valve to thereby vary the amount of fluid under pressure supplied to said indicator.

JOHN A. CROWLEY, Jr.
EDWARD L. SINCLAIR.